United States Patent
Marason et al.

(10) Patent No.: US 9,195,127 B1
(45) Date of Patent: Nov. 24, 2015

(54) REAR PROJECTION SCREEN WITH INFRARED TRANSPARENCY

(71) Applicant: Rawles LLC, Wilmington, DE (US)

(72) Inventors: Eric G. Marason, San Francisco, CA (US); Christopher D. Coley, Morgan Hill, CA (US); William Thomas Weatherford, San Mateo, CA (US); Beverly L. Harrison, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 13/732,916

(22) Filed: Jan. 2, 2013

Related U.S. Application Data

(63) Continuation-in-part of application No. 13/526,298, filed on Jun. 18, 2012.

(51) Int. Cl.
  *G09G 5/00* (2006.01)
  *G06F 3/042* (2006.01)
  *G03B 21/26* (2006.01)
  *G03B 21/28* (2006.01)
  *G03B 21/60* (2014.01)

(52) U.S. Cl.
  CPC ............... *G03B 21/60* (2013.01); *G06F 3/042* (2013.01)

(58) Field of Classification Search
  CPC ............ G02F 1/00; G03B 21/60; G06F 3/042
  See application file for complete search history.

(56) References Cited

U.S. PATENT DOCUMENTS

| | | |
|---|---|---|
| 7,418,392 B1 | 8/2008 | Mozer et al. |
| 7,720,683 B1 | 5/2010 | Vermeulen et al. |
| 7,774,204 B2 | 8/2010 | Mozer et al. |
| 2002/0191907 A1 | 12/2002 | Kinoshita et al. |
| 2003/0160946 A1 | 8/2003 | Yamanaka |
| 2005/0280784 A1 | 12/2005 | Katase et al. |
| 2006/0010400 A1 * | 1/2006 | Dehlin et al. ............... 715/856 |

(Continued)

FOREIGN PATENT DOCUMENTS

| | | |
|---|---|---|
| JP | 2008203789 | 9/2008 |
| WO | WO2011088053 | 7/2011 |

OTHER PUBLICATIONS

Reflect definition, "Reflect_Define Reflect at Dictionary.com", http://dictionary.reference.com/browse/reflect.*

(Continued)

*Primary Examiner* — Aneeta Yodichkas
*Assistant Examiner* — Brent D Castiaux
(74) *Attorney, Agent, or Firm* — Lee & Hayes, PLLC

(57) ABSTRACT

Described herein are systems and techniques for projecting content, periodically or continuously, onto a rear surface of a display medium from behind. The rear projected image is presented on an opposing or front surface of the display medium to a human audience for viewing. Additionally, non-visible light (e.g., IR light) is passed through the display medium to an area in front of the medium. The non-visible light is used to detect human gestures. In this manner, the rear projection arrangement avoids viewer obstruction during projection, yet detects and recognizes gestures made by the viewer in front of the display medium. In one implementation, the display medium comprises a thin sheet of transparent plastic material with arrays of curved optical features to redirect light received on the rear surface out the front surface toward the human audience.

18 Claims, 7 Drawing Sheets

(56) References Cited

U.S. PATENT DOCUMENTS

| | | | |
|---|---|---|---|
| 2006/0044282 A1 | | 3/2006 | Pinhanez et al. |
| 2008/0136796 A1 | | 6/2008 | Dowling |
| 2010/0292886 A1 | * | 11/2010 | Szczerba et al. ............... 701/29 |
| 2011/0025689 A1 | * | 2/2011 | Perez et al. ................... 345/420 |
| 2012/0223885 A1 | | 9/2012 | Perez |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

Office Action for U.S. Appl. No. 13/526,298, mailed on Mar. 28, 2014, Christopher D. Coley, "Rear Projection System with Passive Display Screen", 25 pages.

Office action for U.S. Appl. No. 13/526,298, mailed on Sep. 2, 2014, Coley et al., "Rear Projection System with Passive Display Screen", 27 pages.

Office Action for U.S. Appl. No. 13/526,298, mailed on Dec. 19, 2014, Christopher D. Coley, "Rear Projection System with Passive Display Screen", 27 pages.

Final Office Action for U.S. Appl. No. 13/526,298, mailed on May 18, 2015, Christopher D. Coley, "Rear Projection System with Passive Display Screen", 26 pages.

\* cited by examiner

REAR PROJECTION SCREEN WITH INFRARED TRANSPARENCY

RELATED APPLICATIONS

This is a continuation-in-part of U.S. patent application Ser. No. 13/526,298, entitled "Rear Projection System with Passive Display Screen", which was filed Jun. 18, 2012, and is hereby incorporated by reference.

BACKGROUND

Passive display screens are used to present images that are projected by a projector. For instance, home entertainment systems often use projection systems to project images onto a passive screen to provide a big screen, high quality viewing experience. The images may be projected from the front side of the screen (i.e., the side facing the viewing audience) or from the rear side (i.e., the side hidden from the viewing audience).

With front projection systems, one of the challenges that may impact viewing quality is the physical arrangement of the screen within an environment, relative to the projector, and relative to the viewer(s). Ideally, for a conventional screen, the projector should project the image from a location that is normal to a planar surface of the screen. The viewer should also have a point of view that is normal to the planer surface. But, in this arrangement, the viewer's body (e.g., head, shoulders) may intercept at least a portion of the projected image, blocking that image from reaching the screen. To avoid this unintended obstruction, projectors may be placed in front of the viewers, or from an overhead or side position. However, these placements may not help. For instance, placing the projector in front of the viewers may obstruct the view of the viewer, and moving the projector relative to a conventional screen may cause degradation in the quality of the image presented on the screen.

Rear projection systems avoid challenges caused by potential viewer obstruction, but still encounter unique challenges in that the images are projected onto the screen from behind and yet the screen needs to present high quality images in the opposing direction toward the viewing audience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
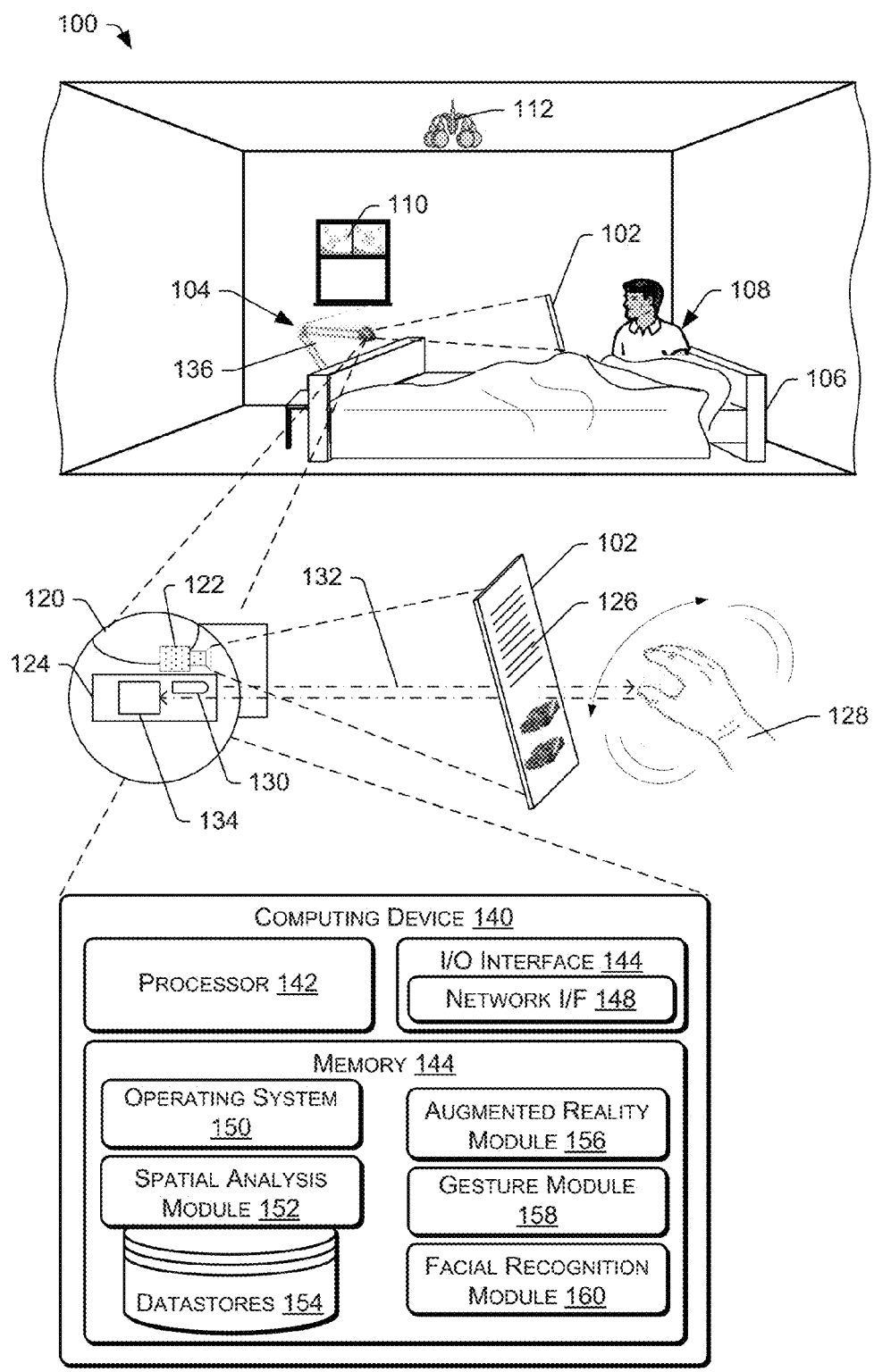
FIG. 1 shows an example environment in which a portable, rear projection, passive display screen may be used in conjunction with a projection system having gesture recognition. The screen presents an image, projected thereon from behind, to a viewer while simultaneously passing non-visible light used to detect human gestures made in front of the screen.

Projection systems are used in a variety of environments including movie theaters, conference rooms, classrooms, homes, and so forth. These projection systems include a projector configured to emit light towards a projection surface or screen. The projection screen, or display medium, is configured to accept and scatter the light such that an image is presented to viewers. The display medium may be fixed, such as one that mounts to a wall or a stand, or portable, such as a handheld projection screen. The various techniques described herein directed to projection screens for receiving projected light from a remote projection system, as opposed to screens for rear projection TVs.

Projecting onto a portable handheld projection screen poses unique challenges. For instance, when projecting onto a portable screen at near normal angles, the viewer's head or shoulders may at times obscure the image. Projecting at an angle to the screen can avoid obstruction of the projection path, but often at the expense of image brightness. Furthermore, when using conventional flat reflective (e.g., white) surfaces, most of the light flux projected onto the surface misses the viewer's viewing cone via Lambertian scattering.

Described herein are systems and techniques for projecting content, periodically or continuously, onto a rear surface of a display medium. The rear projected image is presented on an opposing or front surface of the display medium to a human audience for viewing. In certain described implementations, the display medium is configured to display images for a finite amount of time, during which time the image decays until the image substantially or entirely disappears unless new light is projected onto the display medium. That is, the systems and techniques may project light onto the display medium, with the light energizing particles of the display medium to display a predefined image. Such display mediums may include phosphorescent material, fluorescent material, or a combination thereof.

In another example, the display medium may comprise an electronic paper display, such as an electrophoretic display, a Gyricon display, an electrowetting display, or any other display that mimics ink on paper. The electronic paper display may include multiple particles within respective capsules, as well as photocells associated with respective capsules. The photocells may receive light from a projector to charge the particles, thus moving the particles to appropriate positions within the capsules to collectively display the predefined image. In instances where the electronic paper display is monochromatic, the projector (or another projector) may project color pixels atop the electronic paper display, thus creating a full color image.

In one example, after a projector of the system projects light onto the display medium, the projector may cease the projecting, after which time the display medium will continue to display the image. Sometime thereafter, the projector may again project the light onto the display medium to re-energize the particles and cause the display medium to display the image with a greater intensity (given that the intensity of the image has decayed over the time during no projection has occurred). By periodically projecting the light, the system thus allows for display of an image without the need to continuously project onto the display medium. Furthermore, the projector may modulate the intensity of the image on the display medium by modulating the length of time and/or the intensity of the projection. For instance, the projector may increase the intensity of the image on the medium by increasing the intensity of the projected light.

In some instances, the display medium may include particles that are associated with respective different colors. For instance, a display medium may include particles associated with the colors red, green, and blue. As such, the projector may project different wavelengths of light, with each wavelength energizing one set of the particles (e.g., red, green, or blue). Therefore, projecting the multiple wavelengths of light may cause the display medium to display a color image.

In still other implementations, the display medium may be formed of a thin sheet of transparent plastic material that is embossed with arrays of curved optical features. Each curved optical feature receives visible light from the projector, and internally reflects the visible light out toward the viewer in a way that makes the light appear as if it is emanating from a pixel.

The display medium is also configured to pass non-visible light, such as infrared (IR) light. The non-visible light may be used to illuminate an area on the front side of the display medium to bounce off any objects in that area, such as features of the human. The reflected non-visible light can be captured by the projection system to detect human movement, gestures, and/or expressions. Such gestures may be used in the navigation and/or operation of the projection system. For instance, the IR light may be projected from the projection system, through the display medium, reflected off of a viewer's hand, and returned to the projection system for gesture recognition.

The systems and techniques may be implemented in many ways. One illustrative implementation is described below in which the projection system is implemented as part of an augmented relative environment within a room. However, the system may be implemented in many other contexts and situations in which images are projected onto screens for viewing consumption.

Illustrative Environment

FIG. 1 shows an illustrative environment 100 that may implement a system for projecting content, from the rear, onto a portable passive display medium 102. In this illustration, the environment 100 may be an augmented reality environment created within a scene, and hosted within an environmental area, such as a room of a house (e.g., bed room). An augmented reality functional node (ARFN) 104 is shown within the room. The ARFN 104 may contain projector(s), camera (s), and computing resources that are used to generate the augmented reality environment 100. In this illustration, the ARFN 104 is embodied as a table lamp shown mounted or positioned at the foot of a bed 106 to project images toward the back of a display medium 102. A viewer or user 108 is shown sitting up in the bed 106 and holding the portable display medium 102. Within the environment 100, other features may also be present, such as a window 110 and an overhead lighting fixture 112.

While FIG. 1 illustrates the medium 102 as portable, in some instances the medium 102 may be attached a surface (e.g., a wall), may comprise a paint or coating (e.g., a wall having been painted or coated with a phosphorescent material), or the like.

As shown beneath the room view in FIG. 1, a head 120 of the lamp-based ARFN 104 is enlarged to depict a few of the components arranged therein. In this implementation, the ARFN 104 is equipped with a projector 122 and an interaction detection assembly 124 arranged within the lamp head 120. The projector 122 projects images onto a back surface or side of the handheld display medium 102, opposite to a front surface or side facing the user 108. The projected images may be of any number of things, such as books, games (e.g., crosswords, Sudoku, etc.), news, magazines, movies, a browser or other computer applications, or the like. In this example, a book or magazine 126 pertaining to auto racing is shown projected onto the display medium 102. In this manner, the ARFN 104 provides rear projection capabilities to avoid interference or obstruction by the viewer with respect to the projection path.

The projector 122 may be implemented with any number of technologies capable of generating an image and projecting that image onto a surface. Suitable technologies include a digital micromirror device (DMD), liquid crystal on silicon display (LCOS), liquid crystal display, 3LCD, laser projector, and so forth. In some implementations, the ARFN may include a plurality of projectors to project images.

The viewer 108 may interact with the images being projected onto the display medium 102 and the interaction detection assembly 124 detects and analyzes the human interaction. The human interaction may be in the form of voice, other sounds (e.g., taps, whistles, etc.), gestures, facial expressions, other movement, and so forth. In FIG. 1, the interaction detection assembly 124 is configured to detect human gestures, as illustrated by the viewer's hand 128 being moved in front of the display medium 102. Various gestures—movement, swipe, orientation, and finger arrangement and so on—may be associated with different operations or navigation instructions.

The interaction detection assembly 124 includes an infrared (IR) device 130 to emit non-visible light 132. Examples of non-visible light include infrared light, ultraviolet light, and other light of particular wavelengths within the electromagnetic spectrum that is invisible to a human eye. The display medium 102 is configured to pass the non-visible light 132 so that the non-visible light 132 hits and reflects from the human hand 128. Some of the reflected non-visible light 132 is returned and captured by the ARFN 104 where it is converted to digital data and transferred internally to a gesture detection component 134. It is noted that in some implementations, a visible light may be used in place of the non-visible light 132. For instance, a blue light or other light at a wavelength that passes through the display medium without substantial diffusion may be used.

The gesture detection component 134 analyzes the received IR light data in an effort to recognize patterns indicative of pre-determined gestures made by the viewer's hand 128. One or more candidate gestures are identified based on the captured IR light data, and the candidate gestures are evaluated with respect to the context of the content being projected onto the projection screen 102. Once a statistically likely gesture is identified, the operation or navigation instruction associated with the gesture is executed.

For example, suppose the viewer 108 is reading an automobile magazine 126. The viewer 108 may which to turn the page by moving his right hand in a swiping motion from right to left. The gesture detection component 134 may recognize this action as anyone of multiple candidate gestures, such as a swiping action associated with page turning, an enlarging/minimizing motion associated with changing content size, and a circular movement associated with an instruction to play an in-magazine video clip. For discussion purposes, suppose the gesture detection component 134 assigns the highest statistical probability to the page turning swiping movement. As a result, the projector 122 begins projecting the next page on the display medium 102.

In addition or alternative to gesture detection, the ARFN 104 may be equipped with other components to detect human interaction. For example, the ARFN 104 may include one or more microphones to detect verbal input or other sounds, one or more speakers to output sound, and speech recognition technologies. These audio components enable voice interaction. As another example, the ARFN 104 may be equipped with a camera to capture other forms of user interaction, such as head movement, facial expression, environmental conditions, and so forth.

The lamp-based ARFN may be movable within a predetermined range such that the images projected onto the portable display medium 102 may be in focus. The lamp has an arm mechanism 136 to support the head 120 and facilitate universal movement of the head 120. Further, since in the illustrated example the display medium 102 may be moved by the user 108, the projector 120 in the ARFN 104 may be configured to track the display medium 102 during movement or rotation and project an image onto it for presentation. Tracking may be accomplished by recognizing the shape of the display medium 102, following optical targets disposed on the screen, and so forth.

It is noted that the ARFN may be embodied in other ways. For instance, the ARFN may be implemented as a fixed mount system that may be mounted within the room, such as to the ceiling, at the foot of the bed 106, although other placements are possible.

Associated with the ARFN 104 is a computing device 140, which may be located within the lamp structure, or within the augmented reality environment 100, or disposed at another location external to it. The ARFN 104 may be connected to the computing device 140 via a wired network, a wireless network, or a combination of the two. The computing device 140 has a processor 142, an input/output interface 144, and a memory 146. The processor 142 may include one or more processors configured to execute instructions. The instructions may be stored in memory 146, or in other memory accessible to the processor 142, such as storage in cloud-based resources.

The input/output interface 144 may be configured to couple the computing device 140 to other components, such as projectors, cameras, microphones, other ARFNs, other computing devices, and so forth. The input/output interface 144 may further include a network interface 148 that facilitates connection to a remote computing system, such as cloud computing resources. The network interface 148 enables access to one or more network types, including wired and wireless networks. More generally, the coupling between the computing device 140 and any components may be via wired technologies (e.g., wires, fiber optic cable, etc.), wireless technologies (e.g., RF, cellular, satellite, Bluetooth, etc.), or other connection technologies.

The memory 146 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 146 and configured to execute on a processor, such as the processor 142. An operating system module 150 is configured to manage hardware and services within and coupled to the computing device 140 for the benefit of other modules.

A spatial analysis module 152 may be optionally included and is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. The spatial analysis module 152 provides the information used within the augmented reality environment to provide an interface between the physicality of the scene and virtual objects and information.

One or more datastores 154 may be provided within the memory 146 or separate therefrom. Examples datastores include a system parameters datastore configured to maintain information about the state of the computing device 140, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

The systems parameters datastore may further include calibration metrics. For instance, the ARFN may be calibrated to define a depth field and an acceptable range of focal lengths. The calibration metrics may include anticipated distances from the projector to an expected position of the display medium 102. In the illustrated example, the ARFN 104 is known to be positioned near or at the foot of the bed 106. Further, it is anticipated that the display screen 102 will be held a little closer toward the head of the bed. Thus, the ARFN 104 may be calibrated so that the projection lenses provide images for depiction on the display screen when held within a range of say three to five feet from the projector. This 3-5 feet range would establish a depth of focus supported by the projection system of the ARFN 104.

In some implementations, a calibration table may be stored in the datastores 154 that hold the various calibration metrics for different depth of focus ranges. The table correlates various metrics (e.g., f-number, lens settings, etc.) with associated ranges.

Another example datastore 154 is an object parameters datastore configured to maintain information about the state of objects within the scene. The object parameters may include the surface contour of the object, overall reflectivity, color, and so forth. This information may be acquired from the ARFN, other input devices, or via manual input and stored within the object parameters datastore.

Still another example datastore 154 is an object datastore configured to maintain a library of pre-loaded reference objects. This information may include assumptions about the object, dimensions, and so forth. For example, the object datastore may include a reference object of a beverage can and include the assumptions that beverage cans are either held by a user or sit on a surface, and are not present on walls or ceilings. The spatial analysis module 152 may use this data maintained in the datastore to test dimensional assumptions when determining the dimensions of objects within the scene.

In some implementations, the object parameters in the object parameters datastore may be incorporated into the object datastore. For example, objects in the scene which are temporally persistent, such as walls, a particular table, particular users, and so forth may be stored within the object datastore. The object datastore may be stored on one or more of the memory of the ARFN, storage devices accessible on the local network, or cloud storage accessible via a wide area network.

An augmented reality module 156 is configured to generate augmented reality output in concert with the physical environment. The augmented reality module 156 may employ essentially any surface, object, or device within the environment 100 to interact with the users. The augmented reality module 156 may be used to track items within the environment that were previously identified by the spatial analysis module 152. The augmented reality module 156 includes a tracking and control module configured to track one or more items within the scene and accept inputs from or relating to the items.

In addition, the memory 146 may include a gesture module 158 that uses various capabilities of the ARFN 104 to detect and recognize gestures or other actions made by the viewer 108 in the environment 100. The gesture module 158 may perform the IR light data and/or various types of image processing, including three-dimensional environment analysis, to detect gestures. The gesture module 158 may further analyze gestures to identify multiple possible candidate gestures, and then determine a most statistically probable gesture within the context. Data indicative of detected gestures may be compared to stored gesture data in datastores 154 to identify the candidate gestures.

The memory 144 may also include a facial recognition module 160 to recognize facial characteristics for identification and authentication purposes, as well as facial expressions for human feedback.

These various modules implemented by the computing device 104, as well as other modules not shown, may be configured collectively to perform the techniques described herein for rear projection of images onto a display screen and recognizing user gestures made on an opposing side of the screen. The ARFN 104 may include various interface components, such as user interface components and other components, which may be used to detect and evaluate conditions and events within the environment 100. The interface components may in certain implementations include various types of sensors and transducers, content generation devices, and so forth.

Example Passive Display Screen

Figure 2:
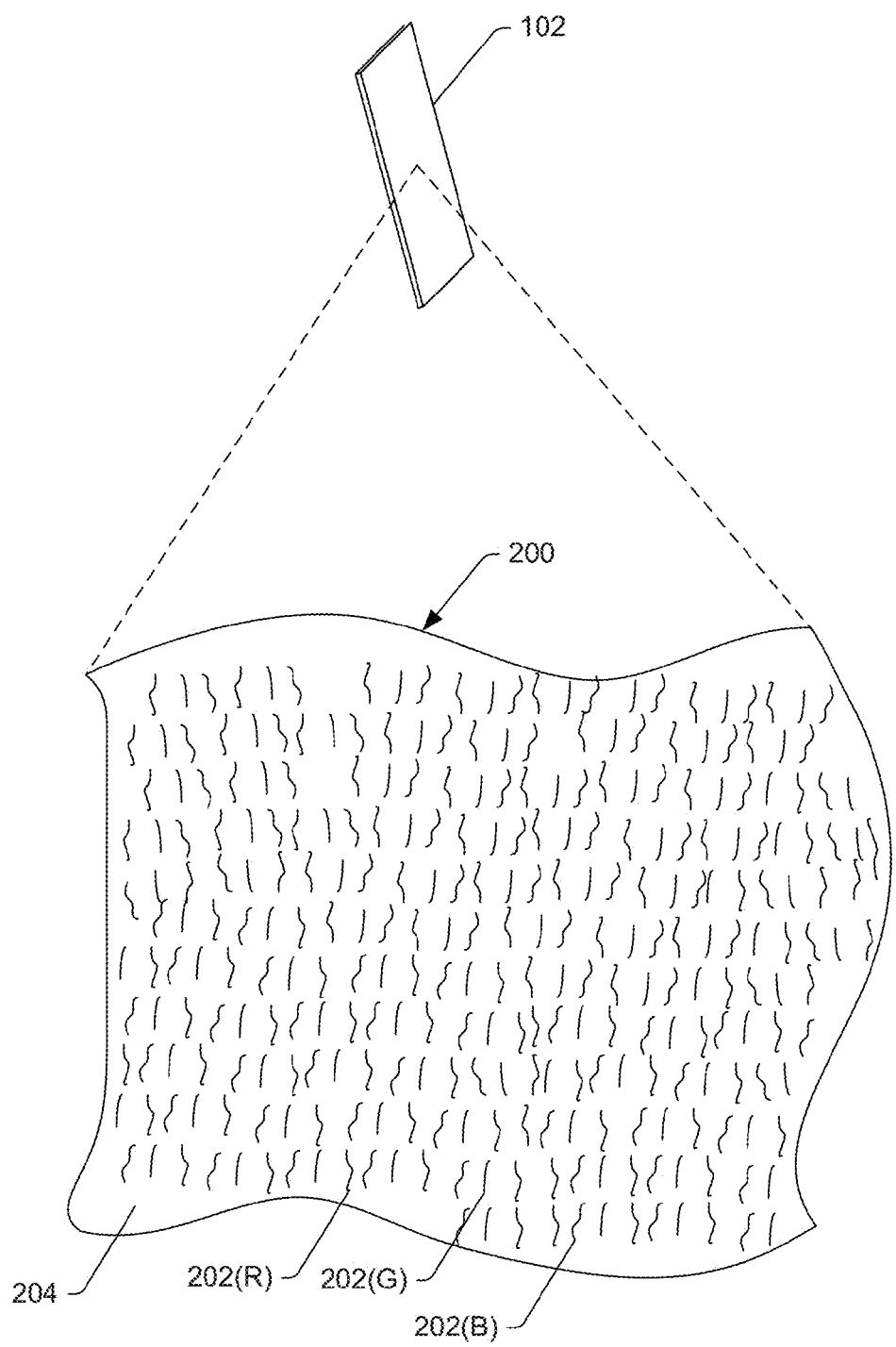
FIG. 2 illustrates one example implementation of the portable, rear projection, passive display screen of FIG. 1.

FIG. 2 illustrates an example implementation of a handheld, passive, rear projection display screen or medium 102. The display medium 102 illustrated in the example implementation is an entirely passive, non-electric device. That is, the display medium 102 may be free from a power supply to power the display medium, such as a battery, a connection to an electrical socket, or the like.

The display medium 102 may comprise a material formed of one or more layers that are collectively designed to diffuse visible light or otherwise present images thereon while simultaneously passing non-visible IR light for gesture detection. In one implementation, the display medium 102 may include phosphorescent material, fluorescent material, or a combination thereof.

In this illustration, a small portion 200 of the display medium 102 is shown enlarged to depict nano particles 202 formed in a transparent material (e.g., glass or plastic) 204. The nano particles may be formed of a phosphorous material and/or a fluorescent material. For purpose of ongoing discussion, the nano particle are described as nano-phosphors 202, which can be activated or energized by energy emission in the form of projected light wavelengths. In one implementation, the projector 122 projects three different wavelengths that energize respective phosphors 202 to emit three color variations, such as red-green-blue (RGB). In some cases, an ultraviolet is may be used in place of red to further differentiate red wavelengths from IR, which is intended to pass through the material.

With reference to FIG. 2, suppose certain elements 202(R) are designed to emit a red color when energized by light projected by the projector 122 at a first wavelength. Second elements 202(G) are designed to emit a green color when energized by light projected by the projector 122 at a second wavelength. And third elements 202(B) are designed to emit a blue color when energized by light projected by the projector 122 at a third wavelength. The elements are designed to emit light for a finite period of time even after the projected light is ceased. In this manner, the display medium possesses a semi-persistent characteristic where the image remains for at least some finite period after the light is stopped.

The nano-phosphor particles of varying color groups may be placed in the same transparent plane, or in individual layers that form the display medium 102. Depending upon the strength and properties of the transparent material, the display medium 102 may be sufficiently rigid without any additional framing or other structural members. Alternatively, a frame may be used to provide structural rigidity.

One suitable material that may be used in the passive display medium is sold under the name Emissive Projection Displays or Superimaging™ brand displays by Sun Innovations Inc. of Silicon Valley, Calif. The emissive projection display (EPD) includes a projector module that projects "latent" images of selective optical wavebands and a transparent fluorescent screen that converts the projected "latent" images to corresponding highly visible emissive images.

In other implementations, a volumetric display may be used as the display medium 102. The volumetric display is a graphical display device that forms a visual representation of an object in three physical dimensions, as opposed to the planar image. In one approach, these display screens have a rotating flat screen onto which images are projected. The rotating screen renders a three dimensional image via emission, scattering, or relaying of illumination from well-defined regions in space.

Figure 3:
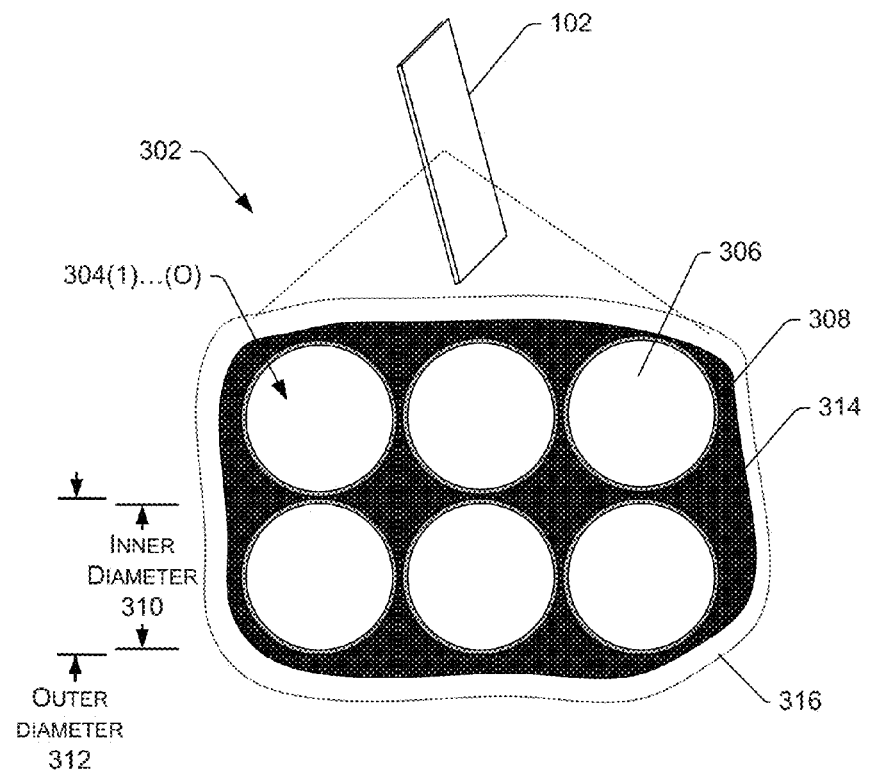
FIG. 3 illustrates another example implementation of the portable, rear projection, passive display screen of FIG. 1. This display screen employs optical waveguides.
Figure 3:
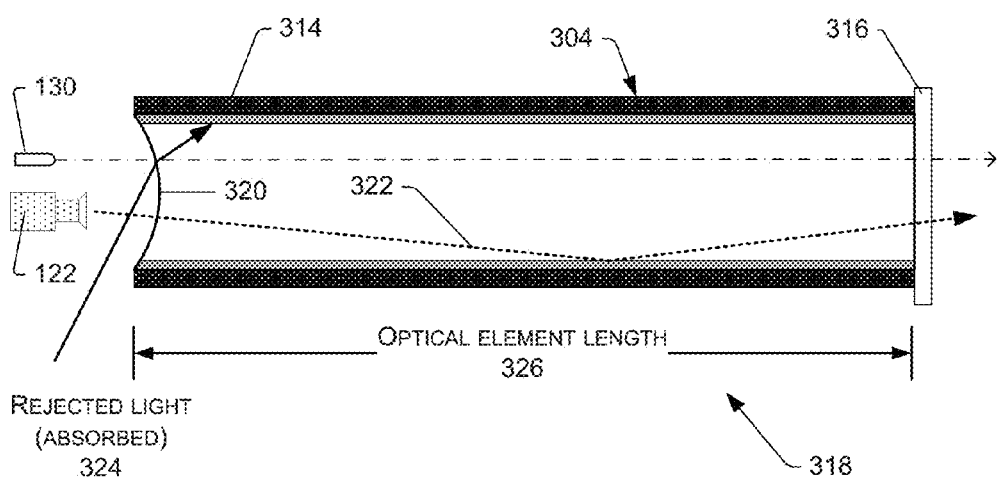

FIG. 3 illustrates another example implementation of a handheld, passive, rear projection display screen or medium 102. Like the implementation of FIG. 2, the display medium 102 shown in FIG. 3 is an entirely passive, non-electric device.

FIG. 3 illustrates a top view 302 of an enlarged portion of the display medium 102. A plurality of optical elements 304(1), 304(2), . . . , 304(O) are arranged on the display medium, such as in a matrix of linear rows and columns, although other patterns may be used. The optical elements 304(1)-(O) form optical waveguides that conduct light and may include, but are not limited to, optical fibers as shown here.

Each optical fiber of an element 304 comprises a core 306 surrounded by a thin cladding 308. The core 306 may be formed of a light conducting material, such as glass, plastic, crystalline material, and so forth. When the optical elements 304 comprise optical fibers, the refractive index of the core 306 may be about 1.589 while the refractive index of the cladding 308 is about 1.517.

The optical elements 304(1)-(O) may be sized such that their width or diameter is equal to or less than a minimum width of a projected pixel. In the example shown here, an inner diameter 310 of the core 306 may be about 94 microns, while an outer diameter 312 of the surrounding cladding 308 may be about 100 microns. Accordingly, individual optical elements 304(1)-(O) are about 100 microns, although they may be smaller.

The optical elements 304 may be held in place or distributed within a matrix configured as an optical absorber 314. The optical absorber 314 is configured to be highly absorptive of visible light frequencies. For example, the optical absorber 314 may comprise black glass, carbon black, or a dark pigment. The matrix may aid in maintaining the optical elements in a generally parallel arrangement with one another.

Behind the optical elements 304 is a light transmissive layer 316, which is optically coupled to the optical elements 304, and is configured to pass both visible and non-visible (e.g., IR) light frequencies. For example, in some implementations, the transmissive layer 316 may comprise a glass or a plastic.

Each optical element 304 is elongated, extending outward from the light transmissive layer 316. FIG. 3 illustrates a side view 318 of one optical element 304. The rear projected light from the projector 122 enters the optical element 304 via an input deflector 320 disposed at the entrance or front of the optical element 304. The input deflector 320 is configured to alter a direction of incident light, and prevents an input angle from matching an exit angle. As shown here, the input deflector 320 may comprise a concave feature present in the optical element 304. For example, an optical fiber may be ground or etched to produce the described concavity. The radius of curvature of the concavity of the input deflector 320 may vary. In the implementation shown, the radius of curvature is about 167 microns. In some implementations, the input deflector 320 may comprise a plano-concave lens optically coupled to the front of the optical element 304. In another implementation, a plurality of optically refractive elements may be used, such as glass or plastic beads. Further, in still other implementations, the end of the optical element may be flat without an input deflector feature.

As shown here, projected light 322 incident on the optical element 304 enters the input deflector 320 and undergoes a change in direction. The light continues down the optical element 304 by internal reflection, reaches the light transmissive layer 316, and is dispersed or scattered for presentation of the rear projected image to the viewer. In contrast, incoming light 324 incident on the optical element 304 at a larger angle enters the input deflector 320, but fails to transfer down the optical element 304 via internal reflection. Instead, the light is readily absorbed by the optical absorber 314 and hence rejected in that it is not reflected out from the optical element 304.

The IR light emitted by the IR device 130 is also transferred down the optical element 304, either directly or through internal reflection, and passes out through the light transmissive layer 316. The transmissive layer 316 passes the IR energy spectrum without disruption so that the IR light can be used to detect user gestures. Reflected IR light also passes back through the transmissive layer 316 and the optical element 304 to the gesture detection component 134 (not shown in FIG. 3).

The optical element 304 has a length 326 from front to the light transmissive layer 316. In one implementation, the length 326 may be a multiple of about five to ten times the outer diameter 312. In another implementation, the length 326 may be at least ten times the outer diameter 312. The optical element length 326 may vary between optical elements 304 within the screen.

Figure 4:
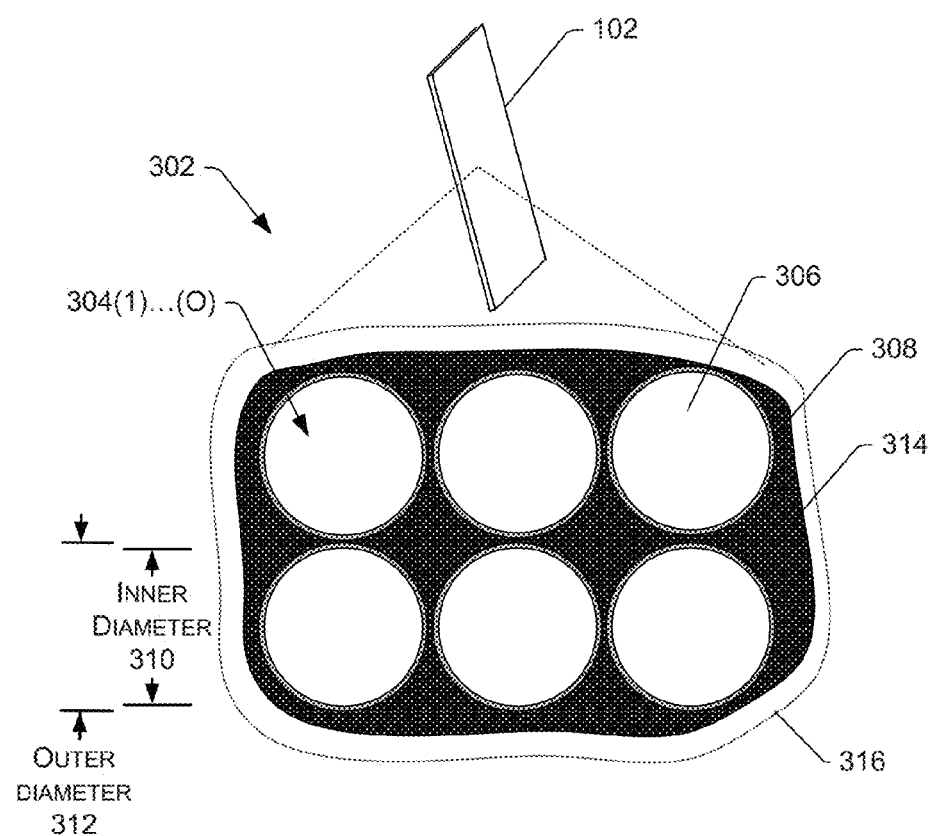
FIG. 4 illustrates still another example implementation of the portable, rear projection, passive display screen of FIG. 1. The display screen of FIG. 4 employs arrays of opposing optical waveguides.
Figure 4:
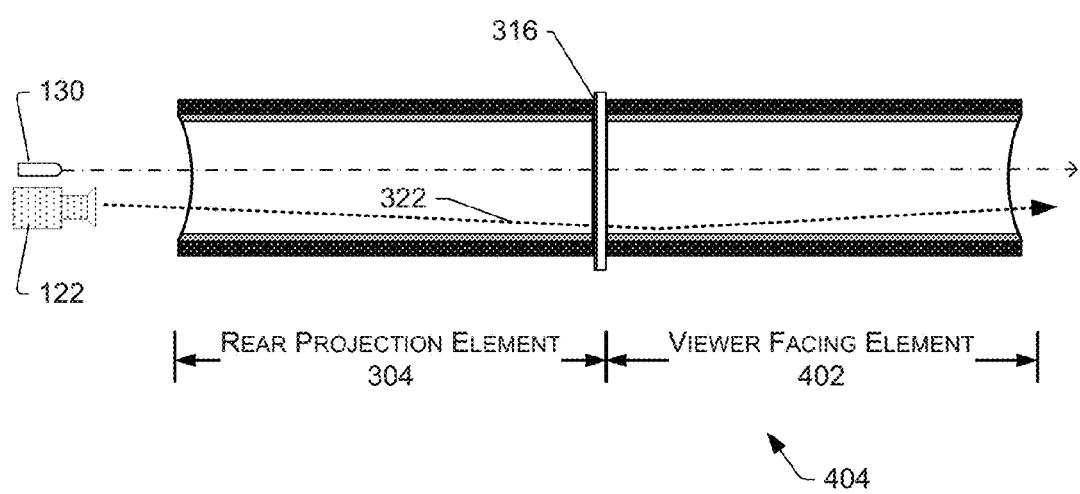

FIG. 4 shows yet another example implementation of a handheld, passive, rear projection display screen or medium 102. It is similar to that shown in FIG. 3, but further includes a mirror set of optical elements 402 on the viewer facing side of the display medium 102, as shown in the side view 404. In this implementation the viewer facing element 402 extends outward from the light transmissive layer 316 toward the viewer. The rear projection optical elements 304 and the viewer facing elements 402 may have identical dimensions (length, cross-sectional area, etc.) or differing dimensions. For instance, the viewer facing elements 402 may have a different length than its corresponding rear projection elements 304.

The FIG. 4 implementation provides some additional advantages in that off-angle light incident on the viewer facing surface of the display medium 102 is absorbed. That is, ambient light from a room lighting source or a window is absorbed or otherwise minimized. As a result, the rear projected image appears brighter to the viewer.

Figure 5:
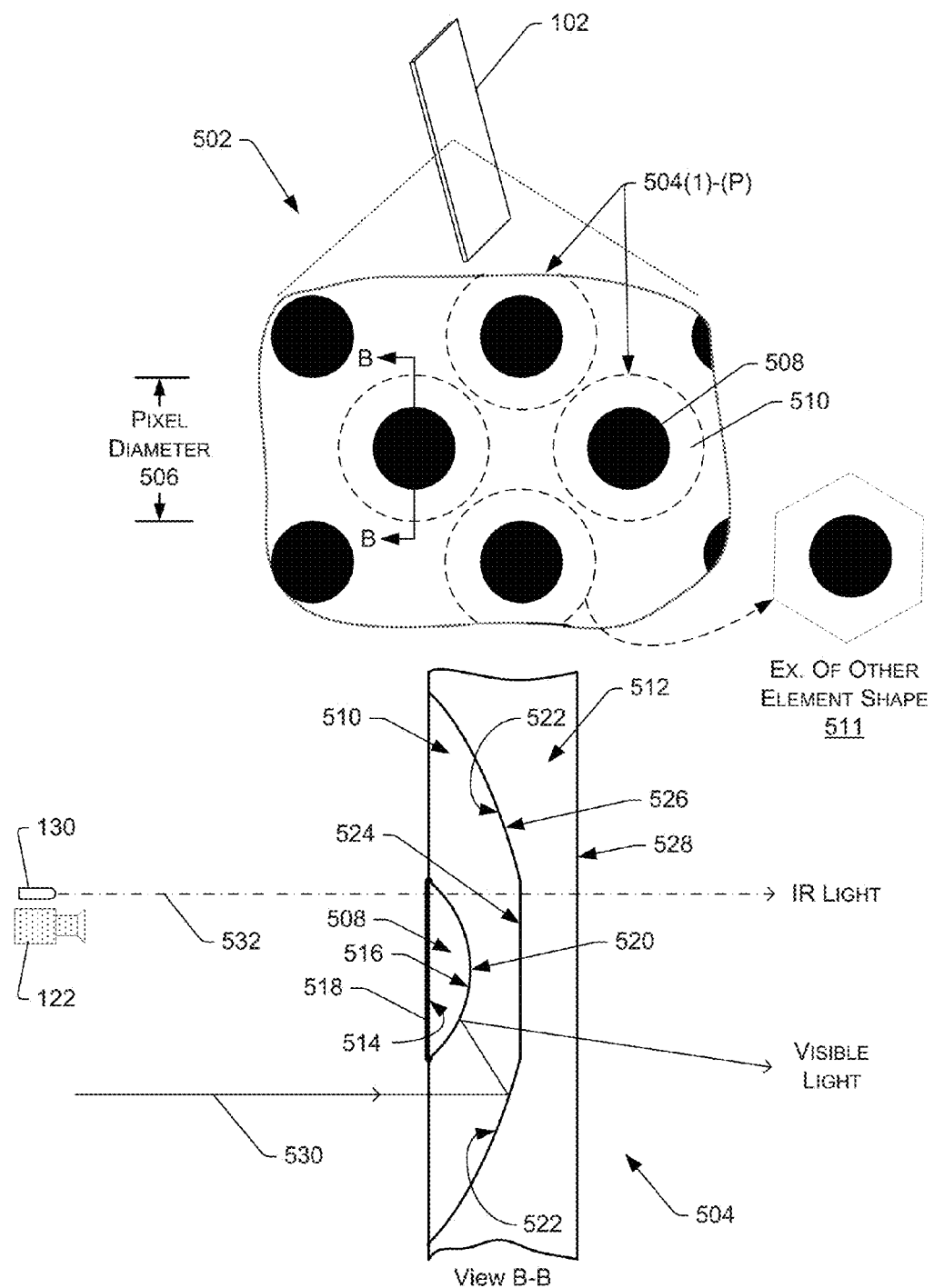
FIG. 5 illustrates yet another example implementation of the portable, rear projection, passive display screen of FIG. 1. The display screen of FIG. 5 is implemented as a thin sheet of transparent plastic material that is embossed with arrays of curved optical features.

FIG. 5 illustrates still another example implementation of a handheld, passive, rear projection display screen or medium 102. Like the implementations above, the display medium 102 shown in FIG. 5 is an entirely passive, non-electric device. In one implementation, the display medium 102 is formed predominantly of a transparent material, such as plastic, polycarbonate, or glass. The transparent material is transmissive to both visible light and non-visible light (e.g., IR light).

A top view 502 shows an enlarged portion of the display medium 102. A plurality of optical elements 504(1), . . . , 504(P) are arranged on the display medium, such as in a matrix of linear rows and columns, or in a hexagonal arrangement, or in other patterns. Each optical element 504 forms a pixel of the display medium 102. In one example implementation, each element 504 has a diameter 506 in a range of 80 to 120 microns, with 100 microns being a suitable size. Each pixel 504 has center region 508 with a circular perimeter, although other shapes are possible. In some implementations, the center region 508 may be darkened or opaque to substantially block visible light from passing through the display medium 102. The center region may be darkened by various techniques, but in one implementation, the region 508 is formed by applying an acrylic paint coating on the transparent material. An opaque or darkened center region helps reduce backscattered light, which might otherwise interfere with the reception and image capture of IR and visible light.

Each optical element 504 also has a larger cup-shaped region 510 that encircles the center region 508. That is, the center region 508 is positioned at the center of a larger cup-shaped region 510, which is identified in the enlarged view 502 as a dashed circle about the center region 508. In other implementations, the outer perimeter of each optical element 504 may have shapes other than circular. For instance, the outer perimeter may be hexagonal as illustrated in FIG. 5 as the example of another element shape 511.

The cooperating relationship between the center region 508 and the cup-shaped region 510 is shown in more detail in the lower part of FIG. 5, which illustrates a cross-sectional view of a single optical element 504 taken through line B-B in the enlarged top view 502. Each optical element or pixel 504 has a first or center region 508 and a second or cube region 510 formed in the third or base region 512. The base region 512 is part of the transparent structural substrate that forms the display medium 102. The center region 508 has flat outer surface 514 with a circular perimeter. The flat outer surface forms a part of the rear surface of the display medium. The center region 508 also has a curved-shaped or convex interior surface 516. In an implementation where the pixel is approximately 100 microns in diameter, a suitable radius of curvature for the surface 516 is approximately 28 microns. In some implementations, a black or dark colored coating 518 can be applied to the outer surface 514 to reduce backscattered light. The coating 518 is configured to pass IR light, but absorb or substantially block visible light.

The cup region 510 encircles the center region 508 and is shaped as a thick-walled cup unit. The cup region 510 has a concave central surface 520 that mates with the curved interior surface 516 of the center region 508. The cup region 510 further has a larger curved surface 522 with a flat center surface 524. In an implementation where the pixel is approximately 100 microns in diameter, a suitable radius of curvature for the large curved surface 522 is approximately 70 microns. The flat center surface 524 has a circular perimeter with a diameter that is roughly the same as the diameter of the circular dot or top surface 514 of the center region 508.

The base region 512 has a concave surface 526 formed to mate with the interior surfaces 522 and 524 of the cup region 510, and a flat outer surface 528. The flat outer surface 528 forms the front surface of the display medium 102.

A reflective coating that is reflective to visible light, but passes IR light, is applied to the curved interfaces between the three regions. More specifically, a reflective coating is applied to the interior surface 518 of the center region 508 and/or the concave surface 520 of the cup region 510. Similarly, a reflective coating is applied to the larger curved surface 522 and/or the mating surface 526 of the base region 512.

When the screen 102 is oriented as shown in FIG. 5, the projector 122 may project visible light at the screen from the left side. The visible light is absorbed by the dark coating 518 of the center region 508, but is passed through the rest of the left side or rear surface, including the cup region 510. As shown by visible light beam 530, once in the cup region 510, the light is reflected from the reflective coating on the surface 522 of the cup region 510 and/or the surface 526 of the base region 512. The first reflection directs the light beam back toward the curved interface at the interior surface 516 and concave surface 520 of the cup region 510. The reflective coating at this interface reflects the light beam back toward the right (i.e., the viewer) where the light passes through and exits the base region 512.

The coating materials on the curved surfaces are configured to reflect visible light, but be transmissive to invisible IR light. In this manner, when the IR device 130 emits IR light from the left side of the screen 102, the IR light 532 passes through the screen 102 and is not reflected or absorbed by any of the surfaces. The IR light is not disrupted by curved surfaces that are not boundaries of a change in refractive index.

Figure 6:
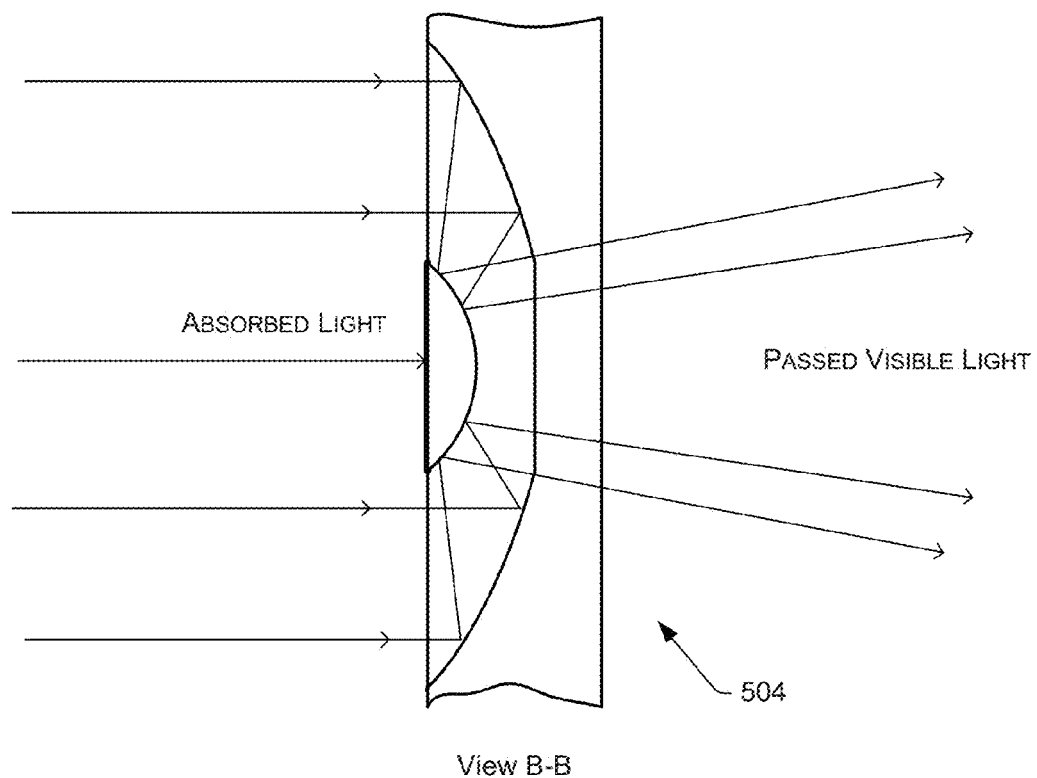
FIG. 6 shows optical characteristics of the display screen of FIG. 5 to pass visible light projected from behind the screen to an audience in front of the screen.

FIG. 6 shows the cross-section view B-B of the pixel 504 to illustrate the reflection patterns of various light beams as they enter the display medium 102 from the left side and exit to the right side. From the viewing side (i.e., the right side), the viewer sees what appears to be light emanating from individual pixels. Accordingly, the display medium 102 provides a favorable user experience by depicting high quality images that have been projected from the rear of the device.

Illustrative Process

Figure 7:
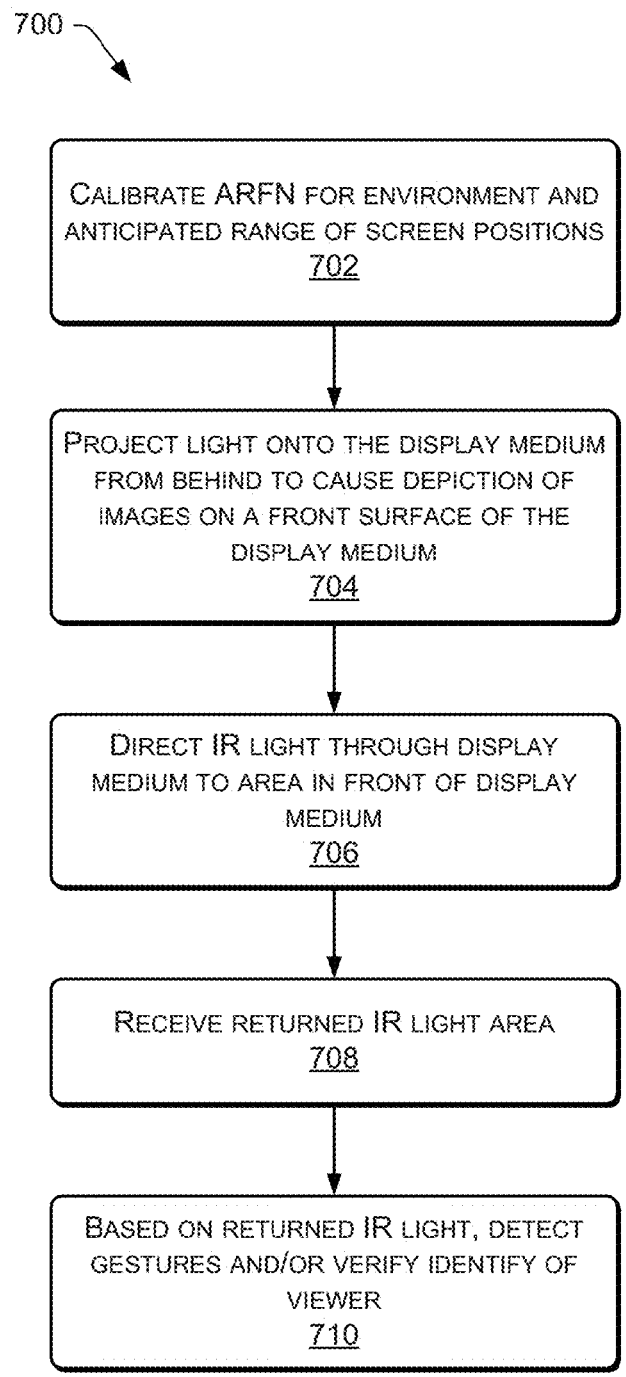
FIG. 7 is a flow diagram of an example process to operate the projection system and passive screen of FIG. 1.

FIG. 7 is a flow diagram of an example process 700 to operate projection system and passive display medium. This process is illustrated as a collection of blocks in a logical flow graph, each operation of which represents a sequence of operations that can be implemented by the display medium, and hardware and/or software implemented by the ARFN. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes.

At 702, the process 700 may involve calibration of the ARFN for use in an environment and anticipated range of screen positions. For instance, the ARFN 104 may be mounted or positioned at a particular location in a room, such as at the foot of a bed as shown in FIG. 1. At this location, the system may further be calibrated to know roughly where the user is likely to hold the portable display medium. If the user plans to read or watch movies in bed, for example, the ARFN 104 may be calibrated to project images approximately 3-5 feet from the foot of the bed, and might focus the projection lens for a 4 foot expectation.

At 704, light is projected from behind onto a back or rear surface of the display medium. The projected light is effective to cause depiction of images on a front surface, opposite to the read surface. In certain implementations, the light contains visible images that are diffused by the display medium for observation by the viewer. In other implementations, the projector projects at least three different light wavelengths to energize nano phosphors held in the display medium to depict three corresponding colors. In still other implementations, the projected image is convey through passive optical elements that accept rear projected light from the projector while rejecting other off-angle light.

At 706, non-visible light is directed through the display medium to an area in front of the display medium. The non-visible light may be IR light. The IR light passes through the display medium, without being diffused, and is reflected upon impact on objects or the viewer.

At 708, part of the IR light reflected from objects and/or the viewer is captured by the ARFN.

At 710, the captured IR light is analyzed to determine whether there is an indication of a user gesture and/or to verify an identity of the viewer. In the case of gesture, human movement may be interpreted as one or more gestures. Accordingly, the ARFN identifies possible candidate gestures, evaluates each gesture to select a most statistically probably candidate, and then implements the most likely candidate. In the case of verification, the IR light may be directed at the viewer's face, with reflected IR light being indicative of the facial shape and characteristics that may be used for viewer authentication.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a processor;
a projector to project images through emission of visible light;
a light emitter configured to emit non-visible light;
a display medium having a rear surface configured to receive the visible light from the projector and a front surface to display the images, the display medium having a plurality of elements arranged on the rear surface, each of the plurality of elements having a first region and a second region, the first and second regions cooperating to internally reflect the visible light received at the rear surface so that the visible light exits from the front surface to depict the images, the second region comprising a cup-shaped member encircling the first region;
the display medium being further configured to allow non-visible light directed to the rear surface of the display medium to pass, at least in part, through the display medium to an environment in front of the front surface of the display medium; and
one or more computer-readable media storing computer-executable instructions that, when executed by the processor, cause the processor to perform acts comprising:
detecting, based at least in part on an interaction of a user of the display medium with the non-visible light passed through to the environment, one or more gestures made by the user;
determining one or more operations to be performed based on the one or more gestures; and
performing at least one of the one or more operations.

2. A system as recited in claim 1, wherein the first region has an outer surface that forms part of the rear surface, the outer surface being substantially flat with a circular perimeter.

3. A system as recited in claim 2, wherein the outer surface is coated with a material that substantially prevents passage of the visible light through the display medium.

4. A system as recited in claim 1, wherein:
the first region has an outer surface coated with a material to substantially prevent passage of the visible light and a curved interior surface to reflect the visible light; and
the second region having a curved surface that reflects the visible light received from the projector centrally toward the curved interior surface of the first region, wherein the visible light is reflected by the curved interior surface toward the front surface to depict the images.

5. A system comprising:
a passive display medium having a front surface and a rear surface, the passive display medium configured to:
receive visible light on the rear surface and internally reflect the visible light so that the visible light exits the front surface to depict images; and
allow non-visible light directed to the rear surface to pass, at least in part, through the display medium to an environment in front of the front surface of the display medium;
wherein the passive display medium comprises a plurality of elements arranged on the rear surface, each of the plurality of elements comprising at least first and second surfaces to internally reflect the visible light, and wherein the first and second surfaces are curved;
a projector to project images to the rear surface of the passive display medium, the projected images causing the images to be displayed for viewing on the front surface of the display medium; and
an interaction detection component configured to detect and interpret human interaction with the non-visible light passed through to the environment.

6. A system as recited in claim 5, wherein each of the elements has a diameter of approximately 100 microns, and the first surface comprises a first curved surface having a radius of approximately 28 microns and the second surface comprises a second curved surface having a radius of approximately 70 microns.

7. A system as recited in claim 5, wherein the interaction detection component is configured to recognize facial expressions of a user of the display medium.

8. A system as recited in claim 5, wherein the interaction detection component comprises an infrared (IR) device to direct IR light through the passive display medium and onto the environment.

9. A system as recited in claim 5, wherein the interaction detection component comprises:
an infrared (IR) device to direct IR light through the passive display medium and onto the environment; and
a gesture detection component to determine gestures made by a user located in the environment based at least in part on detecting IR light scattered from the environment.

10. A system as recited in claim 9, wherein the gesture detection component is further configured to at least one of recognize facial expressions or authenticate the viewer.

11. A system as recited in claim 5, wherein the interaction detection component comprises a gesture detection component to detect gestures made by a user located in the environment and to determine at least one operation to be performed based on the gesture.

12. A system as recited in claim 5, wherein the interaction detection component comprises one or more microphones to detect sound.

13. A passive display medium comprising:
a structure having a rear surface and a front surface; and
a plurality of optical elements arranged in the rear surface, each of the optical elements comprising a first reflective region to receive visible light passing through the rear surface and reflect the visible light internally between the rear and front surfaces, and a second reflective region to reflect the visible light so that the visible light emanates out of the front surface, wherein the first and second reflective regions transmit infrared light.

14. The passive display medium as recited in claim 13, wherein the structure is formed of a light transmissive material comprising at least one of plastic or glass.

15. The passive display medium as recited in claim 13, wherein the first reflective region comprises a concave shape and the second reflective region comprises a convex shape.

16. The passive display medium as recited in claim 13, wherein each of the optical elements comprises:
a first region having an outer surface that forms part of the rear surface and is coated with a material to substantially prevent passage of the visible light, the first region further comprising the second reflective region to reflect the visible light; and
a second region encircling the first region, the second region comprising the first reflective region that reflects the visible light received through the rear surface centrally toward the first reflective region.

17. The passive display medium as recited in claim 13, wherein each of the optical elements has a diameter of approximately 100 microns, and the second reflective region has a curved surface with a radius of approximately 28 microns and the first reflective region has a curved surface with a radius of approximately 70 microns.

18. The passive display medium as recited in claim 13, further comprising an opaque center region to substantially block the visible light from passing through the rear surface.

* * * * *